United States Patent
Neff et al.

(10) Patent No.: US 6,637,451 B2
(45) Date of Patent: Oct. 28, 2003

(54) PNEUMATIC PRESSURE REGULATOR ASSEMBLY

(75) Inventors: Robert H. Neff, Bloomfield Village, MI (US); Jeffrey S. Simmonds, Brighton, MI (US)

(73) Assignee: MAC Valves, Inc., Wixom, MI (US)

( * ) Notice: Subject to any disclaimer, the term of this patent is extended or adjusted under 35 U.S.C. 154(b) by 89 days.

(21) Appl. No.: 10/008,734

(22) Filed: Dec. 6, 2001

(65) Prior Publication Data

US 2003/0106584 A1 Jun. 12, 2003

(51) Int. Cl.$^7$ .............................................. G05D 16/02
(52) U.S. Cl. ................ 137/116.5; 137/505; 137/505.26
(58) Field of Search ............................... 137/116.5, 505, 137/505.18, 505.26, 505.27, 505.42

(56) References Cited

U.S. PATENT DOCUMENTS

| | | | |
|---|---|---|---|
| 4,055,198 A | * 10/1977 | Iannelli | 137/116.5 |
| 4,177,840 A | 12/1979 | Neff et al. | 137/599 |
| 4,197,874 A | 4/1980 | Neff | 137/270 |
| 4,271,864 A | 6/1981 | Neff | 137/599 |
| 4,279,271 A | 7/1981 | Neff | 137/493.8 |
| 4,574,844 A | 3/1986 | Neff et al. | 137/625.65 |
| 4,604,944 A | * 8/1986 | Tsubouchi | 92/98 D |
| 5,136,774 A | 8/1992 | Neff | 29/602.1 |
| 5,452,741 A | * 9/1995 | Tomita et al. | 137/505.26 |
| 5,736,992 A | * 4/1998 | Pawlowski, Jr. | 347/7 |
| 5,950,652 A | 9/1999 | Morgan | 137/14 |
| 6,003,428 A | 12/1999 | Mundie et al. | 91/459 |
| 6,085,632 A | 7/2000 | Stoll et al. | 91/361 |
| 6,119,721 A | 9/2000 | Watanabe et al. | 137/487.5 |
| 6,192,937 B1 | 2/2001 | Fagerlie et al. | 137/625.63 |

* cited by examiner

Primary Examiner—Stephen Hepperle
(74) Attorney, Agent, or Firm—Bliss McGlynn, P.C.

(57) ABSTRACT

A pneumatic pressure regulator assembly including a regulator housing having an inlet adapted for fluid communication with a supply of pneumatic pressure, an outlet adapted to provide pneumatic pressure to a downstream pneumatically actuated device at a regulated pressure, and a regulator valve assembly. The regulator valve assembly has a valve member movably supported within the regulator housing between an open and a closed position. A piston assembly acts to bias the valve member to its open position when the outlet pressure is below a predetermined value. The piston assembly includes a pressure responsive surface defining a geometric shape with a major and a minor axis wherein the major axis is greater than the minor axis. The piston assembly is responsive to pneumatic pressure flowing between the inlet and the outlet to reduce the biasing force acting on the valve member such that the valve member moves to its closed position when the outlet pressure exceeds a predetermined value.

21 Claims, 5 Drawing Sheets

PNEUMATIC PRESSURE REGULATOR ASSEMBLY

BACKGROUND OF THE INVENTION

1. Field of the Invention

The invention relates, generally, to pressure regulators and, more specifically, to a pneumatic pressure regulator having an adjustable regulator piston.

2. Description of the Related Art

Pneumatic pressure regulators are well known in the art and are employed in numerous environments to regulate a pneumatic supply pressure to a predetermined system pressure. The controlled system pressure provided by the regulator is then used to operate the various pneumatically actuated devices within the system. The regulator acts to maintain a desired operating pressure and to eliminate supply pressure fluctuations. In this way, the regulator ensures that the active system devices will operate properly with reliable and repeatable actuations.

In application, there exists a wide variety of manufacturing and processing environments where a high pneumatic flow rate and very fast response time are desired. It is essential that accurately regulated pneumatic pressure be provided to the active devices in these environments. As the process technology in these production environments has advanced, there has been an increase in the demand for smaller and more accurate active pneumatic devices, and subsequently, for smaller and more accurate regulators to control the supply pressure. Additionally, to achieve greater control and accuracy, depending upon the specific application, a number of regulators may be used at various locations throughout the pneumatic system, even to the point of providing a separate regulator for each individual active device. In these circumstances, it is desirable to locate the regulators in very close proximity to the active devices. This, in turn, places the regulators extremely close to the manufacturing or processing events, which requires that the regulators be installed in tight spaces with even smaller dimensions.

Known pressure regulators utilizing a diaphragm to control output pressure are generally too large to be utilized in these environments. This is one factor that has driven the ongoing improvements and advances in piston-controlled regulators. Regulators of this type typically use a piston movably supported within a bore. The piston is responsive to regulate the downstream pressure acting upon it. The piston may be operatively connected to or associated with a poppet control valve, so that as the piston moves in response to the downstream pressure. More specifically, when the downstream pressure exceeds a desired maximum, control and thereby regulation is subsequently effected to regulate the input pressure to a desired output pressure.

Generally speaking, pistoned regulators are better suited for use in the tight confines of the above-mentioned operating environments than diaphragm operated regulators of the type commonly known in the art. However, in the past, certain design barriers have limited the extent to which the piston size, and therefore the regulator itself, could be reduced. When the active surface area of the piston is reduced below a predetermined amount, accurate pressure control may be lost. To counter this, larger, piston controlled pressure regulators presently known in the related art may be employed remotely from the remainder of the pneumatically actuated system. Thus, these larger, remotely disposed regulators suffer the continuing requirement that they must be interconnected via conduits or other flow passages, which require additional hardware and plumbing, and can lower pneumatic efficiencies and introduce line losses within the system.

While the use of larger, remotely disposed regulators has generally worked well in the past, there remains an ongoing need in the art to simplify pneumatic systems and thereby lower costs of manufacture and/or assembly by creating ever smaller, yet highly accurate, piston controlled pressure regulators. Smaller regulators can be located in very close proximity to active system components, thereby shortening flow paths, reducing or eliminating additional plumbing and hardware, and increasing pneumatic flow efficiency. The solutions to these problems that have been proposed in the related art have failed to overcome the problems created when the active surface area of the piston falls below a minimal piston size in an attempt to achieve the desired regulator size criteria.

SUMMARY OF THE INVENTION AND ADVANTAGES

The present invention overcomes the disadvantages of the related art in a pneumatic pressure regulator assembly. The pneumatic pressure regulator assembly includes a regulator housing having an inlet adapted for fluid communication with a supply of pneumatic pressure at a first elevated pressure, at least one outlet adapted to provide pneumatic pressure to at least one downstream pneumatically actuated device at a second, lower regulated pressure and a regulator valve assembly. The regulator valve assembly has a valve member movably supported within the regulator housing between an open position and a closed position. A piston assembly is movably supported in the regulator housing and acts to bias the valve member to its open position when the downstream pressure flowing through the outlet is below a predetermined value. The piston assembly includes a pressure responsive surface defining a geometric shape having a major axis and a minor axis wherein the major axis is greater than the minor axis. The piston assembly is responsive to pneumatic pressure flowing between the inlet and outlet to reduce the biasing force acting on the valve member such that the valve member moves to its closed position when the downstream pressure flowing through the outlet exceeds a predetermined value.

One advantage of the present invention is that it provides an accurate and highly responsive pressure regulator, which can be constructed of a smaller size than has been previously attainable in the conventional art. More specifically, the width of the pressure regulator of the present invention may be reduced as compared to known regulators in the related art such that it is relatively thin while still providing sufficient surface area to the piston such that the regulator maintains its responsiveness.

Another advantage of the present invention is that by providing a pressure regulator of much smaller size, the present invention can be installed on, or in close proximity to, the device being regulated such that the flow paths therebetween are shortened and the number of related hardware components are reduced. This simplifies the design of pneumatically actuated systems, which leads to reduced costs, increased efficiency and convenience.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
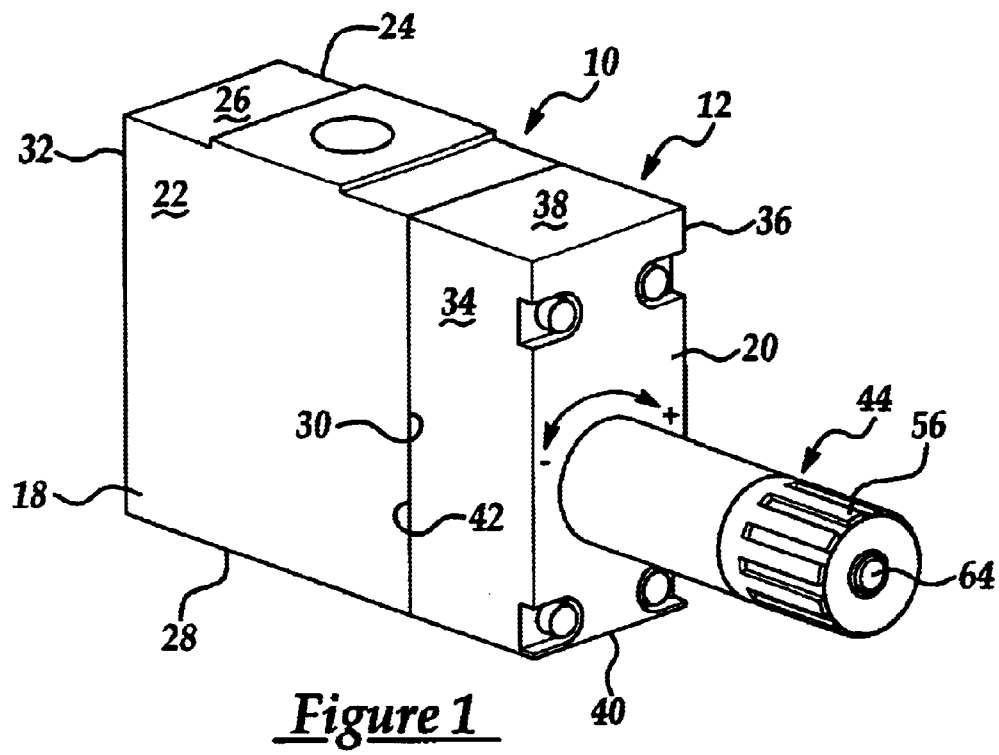
FIG. 1 is a perspective view of the pneumatic pressure regulator assembly of the present invention.
Figure 5:
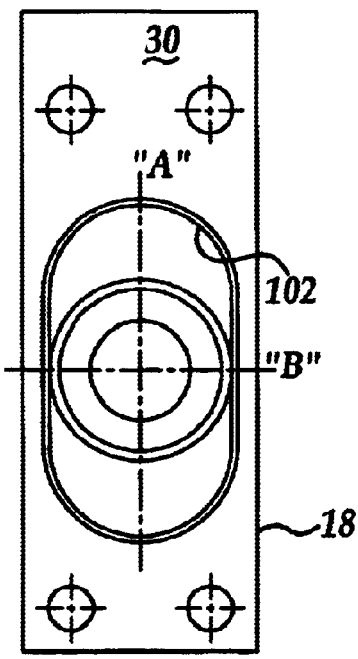
FIG. 5 is an end view of the pneumatic pressure regulator assembly of the present invention taken substantially along lines 5—5 of FIG. 4.

A pneumatic pressure regulator assembly of the present invention is generally indicated at 10 in FIGS. 1–4. The pneumatic pressure regulator assembly 10 of the present invention is designed for use as a part of any number of pneumatically actuated systems to regulate the supply pressure to a predetermined system pressure. The assembly 10 includes a regulator housing, generally indicated at 12. The regulator housing 12 includes a main body 18 and an adjustment bonnet 20. The main body 18 is defined by a pair of sidewalls 22, 24 and a pair of end walls 26, 28 that extend between the pair of sidewalls to define the width of the regulator assembly 10. The main body 18 further includes upper and lower mounting surfaces 30, 32, respectively. The adjustment bonnet 20 is mounted to the upper mounting surface 30 of the main body 18 by any conventional means. Accordingly, the adjustable bonnet 20 has similar and corresponding side and end wall structure. More specifically, the adjustment bonnet 20 includes a pair of sidewalls 34, 36 and a pair of end walls 38, 40 extending therebetween. The adjustment bonnet 20 also has a lower mounting surface 42 that is adapted to be mounted to the corresponding upper mounting surface 30 of the main body 18. Finally, the adjustment bonnet 20 includes a regulator adjustment assembly, generally indicated at 44, as will be described in greater detail below.

As best shown in FIG. 1, in the preferred embodiment, the regulator housing 12 is substantially rectangular in shape having end walls of shorter dimension than its sidewall. This gives the housing 12 a thin profile that facilitates its use in tight places. Certain features of the regulator assembly 10 of the present invention facilitate this optimum profile as will be explained in greater detail below. However, those having ordinary skill in the art will appreciate that, within the scope of the appended claims, the regulator housing may have any suitable geometric shape.

Figure 2:
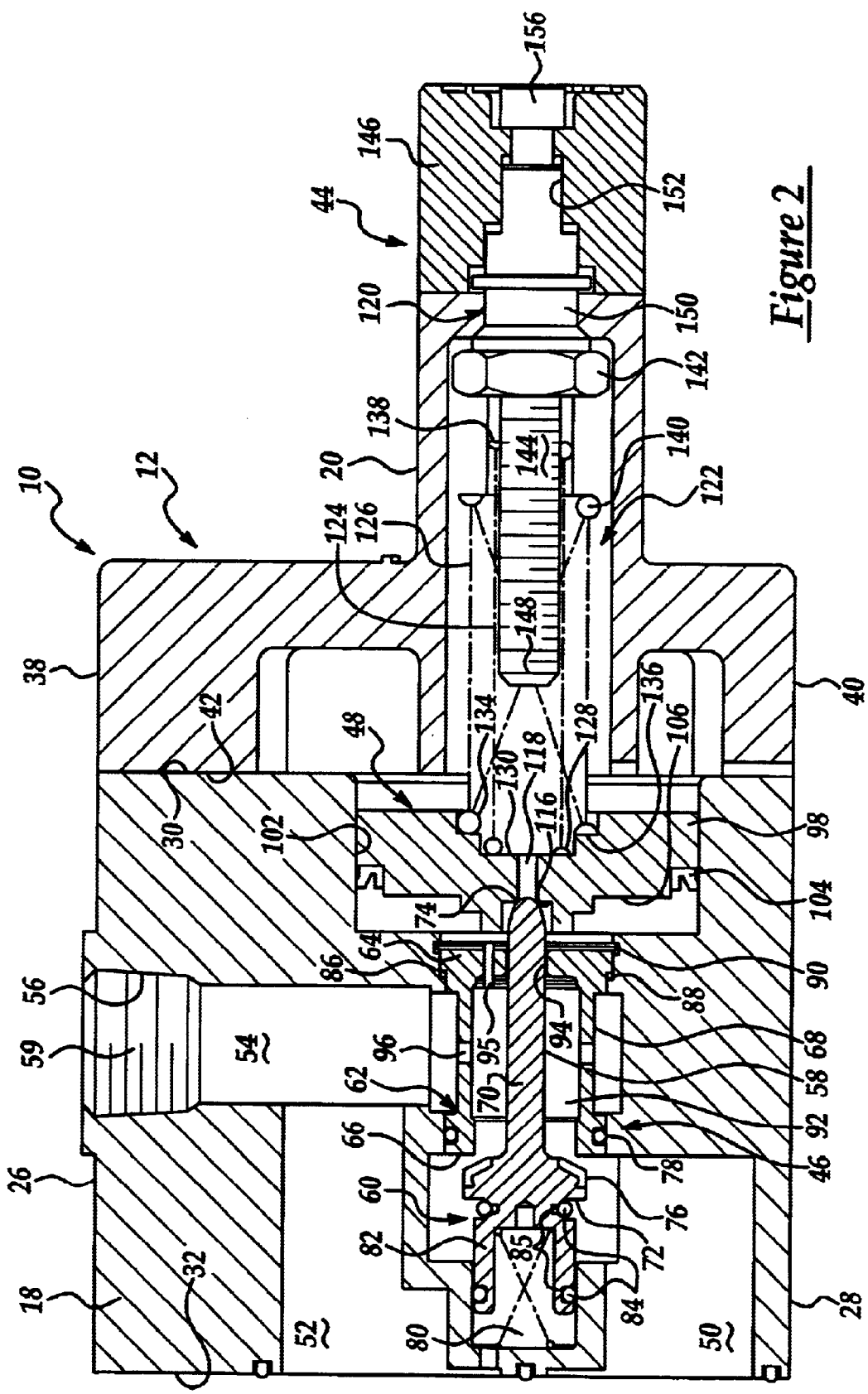
FIG. 2 is a cross-sectional side view of the pneumatic pressure regulator assembly of the present invention shown with the regulator valve assembly in its open position.
Figure 3:
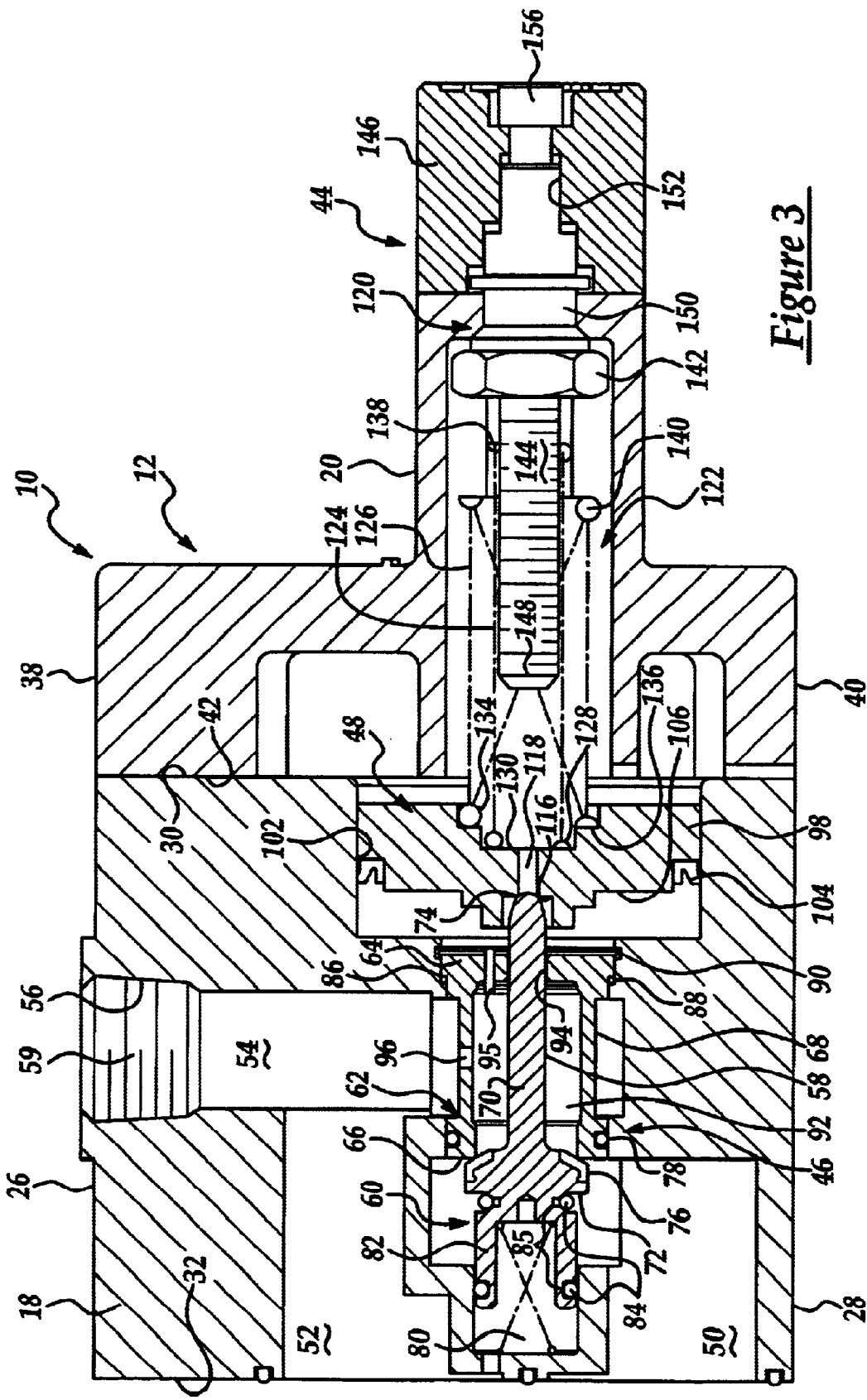
FIG. 3 is a cross-sectional side view of the pneumatic pressure regulator assembly of the present invention shown with the regulator valve assembly in its closed position.
Figure 4:
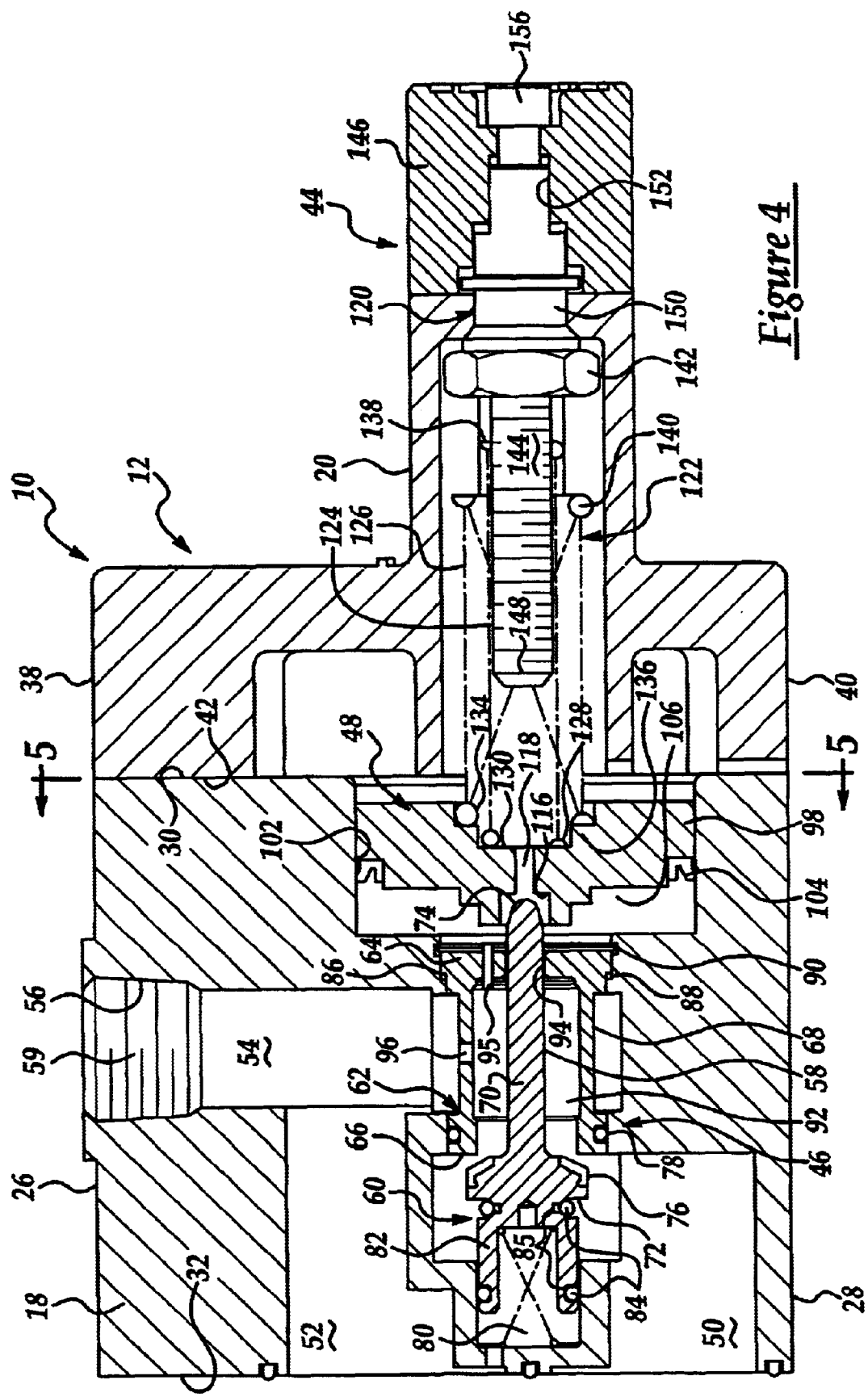
FIG. 4 is a cross-sectional side view of the pneumatic pressure regulator assembly of the present invention shown with the regulator valve assembly in its closed position and the bleed vent open.

As best shown in FIGS. 2–4, the main body 18 of the regulator housing 12 supports a regulator valve assembly, generally indicated at 14, and a piston assembly, generally indicated at 48. The main body 18 of the regulator housing 12 includes an inlet port 50 and at least one outlet port 52. In the preferred embodiment illustrated in these figures, the inlet port 50 and outlet port 52 are both formed through the lower mounting surface 32 of the main body 18. The inlet port 50 is operatively connected in known matter to a supply of pneumatic pressure. The pneumatic supply is at a first elevated pressure as commonly known in the art. In addition, the regulator main body 18 may also have a secondary outlet port 54 that may be formed, for example, in an end wall 26 or 28 of the main body 18. The secondary outlet port 54 may be physically connected to, and be in fluid communication with, an external gage or pressure monitoring line (not shown) by any known attachment means such as threads at 56. Alternatively, the secondary outlet port 54 may be closed off using a plug shown in phantom in at 59.

The regulator valve assembly 46 is supported in the main body 18 of the regulator housing 12 between the inlet port 50 and the outlet port 52 as well as between the inlet port 50 and the secondary outlet port 54, if one is employed. Thus, the regulator valve assembly 46 controls the flow of pneumatic pressure through its regulator assembly 10. To that end, the regulator valve assembly 46 includes a valve member, generally indicated at 58, a valve biasing assembly, generally indicated at 80, and a valve retainer, generally indicated at 62. The valve retainer 62 includes a head portion 64, a valve seat 66, and a body portion 68 extending between the head portion 64 and the valve seat 66, as will be described in greater detail below. The valve member 58 of the regulator valve assembly 14 includes a valve stem 70 and a valve element 72. The valve stem 70 is elongated and terminates in a distal end 74. The valve element 72 defines a sealing surface 76 for a purpose that will be described in greater detail below.

The valve member 58 is operatively disposed within the valve retainer 62 such that the valve member 58 is in its open position, as shown in FIG. 2, when the valve element 72 is spaced from the valve seat 66 thereby allowing fluid communication between the inlet 50 and the outlet 52. The valve sealing surface 76 is adapted for sealing engagement with the valve seat 66 when the valve element 72 is in its closed position, as shown in FIG. 3, thereby interrupting fluid communication between the inlet 50 and the outlet 52 when the downstream pressure exceeds a predetermined value. To this end, the valve retainer 62 may include one or more O-ring seals 78 that are cooperatively received in corresponding grooves formed in the retainer 62 or the main body 18 of the regulator housing 12.

The valve biasing assembly 60 includes a biasing member 80 that is captured between a cup-shaped retainer 82 and the main body 18. The biasing member 80 acts to bias the valve element 72 to its closed position against the valve seat 66. More specifically, when the valve member 58 is in its closed position, the valve biasing assembly 60 will act to force the sealing surface 76 of the valve member against the valve seat 66. As illustrated in these figures, the biasing member 80 may be a coiled spring. In the preferred embodiment, the cup-shaped retainer 82 is formed integrally as a part of the valve member 58 opposite the distal end 74 of the valve stem 70. However, those having ordinary skill in the art will appreciate that the biasing member 80 may be formed by any conventional means and that the cup shaped retainer 82 may be formed as a separate component apart from the valve member 58.

The valve element 72 is formed between the valve stem 70 and the cup-shaped retainer 82. In the preferred embodiment, the valve member 58 is an aluminum regulator poppet valve that is over-molded with a suitable resilient material such as rubber, or any known elastomer, in the appropriate places. More specifically, it should be appreciated by those having ordinary skill in the art that the material of the sealing surface 76 may be made of any known composition that is slightly yielding, yet highly resilient, such as nitrile, which may be bonded, or over-molded to the valve element 72. Like the valve retainer 62, the valve member 58 may also include one or more O-ring seals 84 that are cooperatively received in corresponding grooves 86 formed, for example, about the circumference of the cup-shaped retainer 82 or at any other appropriate place.

The head portion 64 of the valve retainer 62 includes a stepped surface, generally indicated at 86 that cooperates with a corresponding surface, generally indicated at 88, defined in the main body 18 of the regulator housing 12. A retaining ring 90 cooperates with the main body 18 to hold the retainer 62 in a fixed position. In addition, the body portion 68 defines a valve stem passage 92 extending therethrough. More specifically, the body portion 68 is preferably hollow and cylindrical and defines the valve stem passage 92 through which the valve stem 70 of the valve member 58 extends. The valve member 58 cooperates with the head portion 64 of the valve retainer 62 so that the distal end 74 and a portion of the valve stem 70 operatively pass through an opening 94 in the head portion 64 of the valve retainer 62, opposite the valve seat 66. The opening 94 is slightly larger than the diameter of the valve stem 70 allowing for relative movement between the valve stem 70 of the head portion 64.

The body portion 68 of the valve retainer 62 includes a plurality of flow passages 96 radially spaced from one another about the circumference of the body portion 68 of the retainer 62. The valve stem passage 92 and the flow passages 96 provide fluid communication between the inlet port 50 and the outlet port 52 of the regulator assembly 10. Additionally, there is a plurality of head flow passages 95, radially spaced from one another about the circumference of the head portion 64 of the retainer 62, which allows fluid communication between the valve stem passage 92 and the piston bore 102 as described below.

The piston assembly 48 includes a regulator piston generally indicated at 98. In the preferred embodiment, the piston assembly 48 is disposed in the main body 18 while the regulator adjustment assembly 44 is disposed within the adjustment bonnet 20. More specifically, the piston assembly 48 is movably supported in the main body 18 and acts to bias the valve member 58 to its open position when the downstream pressure flowing through the outlet 52 is below a predetermined value. A corresponding piston bore 102 is defined within the regulator housing 18. The piston bore 102 is open at the upper mounting surface 30 of the main body 18. The piston 98 is movably supported within the piston bore 102. A sealing member 104 is disposed about the outer perimeter of the piston for so as to facilitate an airtight seal between the piston 98 and the piston bore 102.

Figure 6:
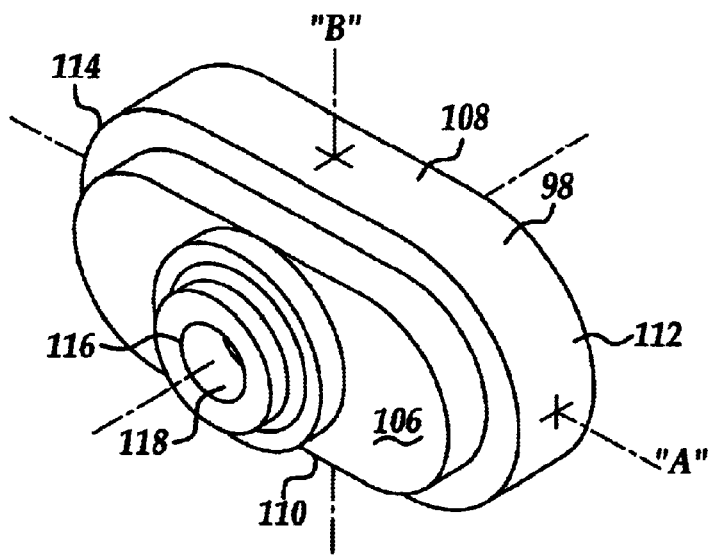
FIG. 6 is a perspective view of the regulator piston of the present invention.
Figure 7:
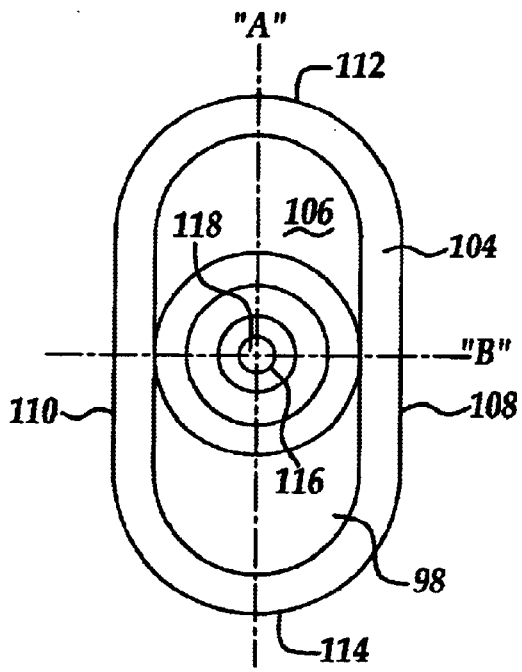
FIG. 7 is an end view of the pressure responsive surface of the regulator piston.
Figure 8:
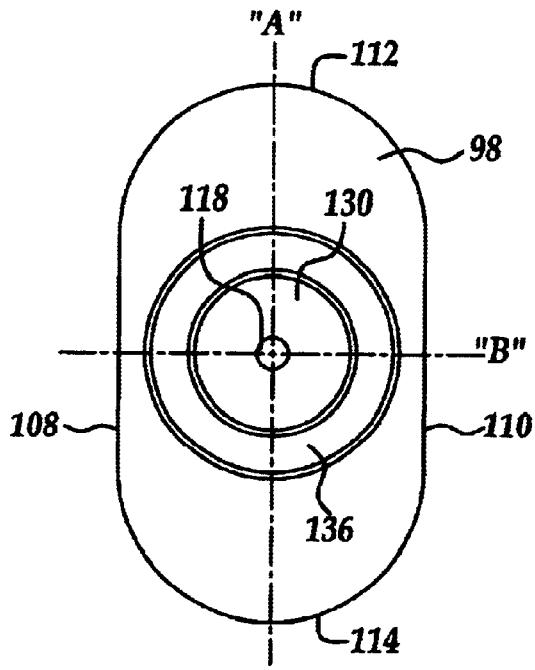
FIG. 8 is an end view of the regulator piston of the present invention.

The piston assembly 48 includes a pressure responsive surface 106 that defines a geometric shape having a major axis "A" and a minor axis "B" wherein the major axis "A" is greater than the minor axis "B". In the preferred embodiment, the pressure responsive surface 106 is formed on one side of the piston 98. Thus, the pressure responsive surface 106 has an elongated shape that maximizes the surface area within the thin rectangular confines of the main body 18 of the regulator housing 12. As will be described in greater detail below, this structure facilitates an accurate and highly responsive pressure regulator 10 that has a much smaller physical size than has been previously attainable in the related art. Those having ordinary skill in the art will appreciate that the piston 98, per se, may also define a geometric shape having a major axis "A" and a minor axis "B" wherein the major axis "A" is greater than the minor axis "B". The piston bore 102 defines a geometric shape that is complimentary to the piston 98 and thus may also have a major axis "A" and a minor axis "B" wherein the major axis "A" is greater than the minor axis "B". In the preferred embodiment, and as best shown in FIGS. 6–8, the piston 98 includes elongated sidewalls 108 and 110 that smoothly merge with rounded, but shorter end walls 112 and 114, extending therebetween. In the preferred embodiment, the pressure responsive surface 106, the piston 98 and the piston bore 102 all define an oval shape. As used herein, the term "oval" means any geometric shape having a major axis that is greater than a minor axis and does not imply that the pressure responsive surface 106 is limited to merely an oval or elliptical shape. Thus, it should be appreciated by those skilled in the art that the pressure responsive surface 106, the piston 98, and the piston bore 102 may encompass a wide variation of geometric shapes having a major axis that is greater than a minor axis without departing from the spirit or scope of the invention.

The piston 98 also has a receptacle 116, formed on its pressure responsive surface 106 that is adapted to receive the distal end 74 of the valve stem 70. A bleed vent 118 extends through the piston 98 and thereby provides for pressure relief as will be described in greater detail below. The pneumatic pressure flowing between the inlet 50 and the outlet 52 is delivered to the pressure responsive surface 106 through the valve stem passage 92 and the opening 94 extending through the head portion 64 of the valve retainer 62, as discussed above. This causes the piston 98 to move to the right as illustrated in the figures and reduces the piston biasing force acting on the valve member 58 such that the valve member 58 moves to its closed position when the downstream pressure flowing through said outlet 52 exceeds a predetermined value.

The regulator adjustment assembly 44 includes an adjustment member generally indicated at 120 and a biasing member, generally indicated at 122, disposed between the adjustment member 120 and the piston 98. The biasing member 122 exerts a biasing force that may be selectively adjusted by moving the adjustment member 120 toward or away from the piston, with the adjustment corresponding to a pre-determined pressure value. The piston biasing member 122 may include at least one coiled spring disposed between the adjustment member 120 and the piston 98. In the preferred embodiment, the piston biasing member 122 includes a pair of coiled springs 124, 126 supported in concentric and coaxial relationship to one another. Spring 124 may be referred to as the inner concentric spring. Spring 126 may be referred to as the outer concentric spring. One end 128 of the inner spring 124 is received by a corresponding shoulder 130 formed on the topside 132 of the piston 98. Similarly, one end 134 of the outer spring 126 is received by a corresponding shoulder 136 formed on the topside 132 of the piston 98. The opposite ends 138, 140 of each coiled spring 124, 126, respectively are adapted to be engaged by the adjustment member 120 as will be described in greater detail below.

The adjustment member 120 includes an adjustment nut 142 that is moveably supported upon a threaded adjustment stem 144 for movement toward or away from the piston 98. An adjustment knob 146 is operatively connected to the adjustment stem 144. One end 148 of the adjustment stem 144 extends into the adjustment bonnet 20 within the concentrically disposed coiled springs 124, 126. The adjustment knob 146 is disposed over the other end 150 of the adjustment stem 144 and securely engages the adjustment stem 144 by a known manner, such as by splines or a keyway, as generally indicated at 152. Rotation of the adjustment knob 146 rotates the threaded adjustment stem 144 causing movement of the adjustment nut 142 toward or away from the piston 98. In this way, the adjustment nut 142 is first moved into engagement with one end 138 of the inner coiled spring 124 thereby imparting a first level of bias to the piston 98. Further movement of the adjustment nut 142 along the stem 144 causes the nut 142 to engage one end 140 of the outer coiled spring 126 thereby providing an additional level of biasing force to the piston 98. In this way, the biasing member 122 is adapted to provide for two levels of incremental adjustments (i.e., both course and a fine increments), with both springs 124, 126, acting in combination, to provide a wide range of regulation of the downstream pressure. Those having ordinary skill in the art will appreciate that the dual spring structure of the biasing member 122 affords greater response to a wide variation of pressure exerted upon the piston 98. It should be further appreciated that the biasing member 122 may be a single coiled spring, a plurality of coiled springs, or any other biasing member known in the related art as the application might specifically warrant without departing from the spirit or scope of the invention.

The regulator adjustment assembly 44 further includes a locking screw 156. The locking screw 156 is threadably engaged within the end of the adjustment stem 144 so as to hold the entire adjustment assembly 44 securely in place when the locking screw 156 is tightened down. When the locking screw 156 is loosened, the adjustment knob 146 is free to turn and adjusts the biasing force applied to the piston 98 by the running the adjustment nut 142 along the length of the adjustment stem 144, either increasing or decreasing the pressure exerted on the biasing member 122 as explained above.

OPERATION

In operation, it should be appreciated that the pressure regulator assembly 10 will be in fluid communication to a source of pneumatic pressure via the inlet 50 and will be in fluid communication with a pneumatically actuated device via the outlet 52. As desired by an operator, a pre-determined regulated pneumatic pressure is chosen to be output by the regulator assembly 10 of the present invention to the downstream active device. The locking screw 156 is loosened and the adjustment knob 146 is turned to achieve a specific biasing force on the piston 98. The bias force exerted on the piston 98 by the biasing member 122 acts through the distal end 74 of the valve stem 70, as it is received in the receptacle 116 in the piston 98. To the extent this force exceeds the bias force of the valve biasing member 80, it moves the valve member 58 to its open position. This allows the supplied pneumatic pressure to move from the inlet 50 past the valve element 72 and valve seat 66, into the valve retainer 62, through the plurality of flow passages 96 and past outlet 52, to the pneumatically actuated device (not shown). An external pressure gage, for example, may be operatively connected through the secondary outlet port 54 to monitor the downstream pressure flowing through the outlet 52.

Generally, the system pressure is delivered at a greater pressure than is desired for the operation of the active device. As such, the regulator 10 must reduce or "regulate" the excessive supply pressure to the predetermined value selected by the operator. Thus, the biasing force selected by manipulation of the adjustment assembly 44 correlates to a counter-balancing pneumatic pressure level that acts upon the pressure responsive surface 106 of the piston 98 through the valve stem passage 92.

Specifically, as the downstream pressure exceeds the predetermined desired regulated pressure level, as set by the biasing force placed on the piston 98 by biasing member 122, the excessive downstream pressure will feedback from the outlet port 50 through the plurality of flow passages 96 of the retainer 62 into the valve stem passage 92 and through the plurality of head flow passages 95 in the head portion 64 of the valve retainer 62, against the pressure responsive surface 106 of the piston 98. This pressure, in combination with the biasing force generated by the valve biasing member 60, moves the piston 98 to the right as viewed in FIG. 3. When the piston 98 is moved sufficiently to the right, the valve element 72 is moved to its closed position, where the sealing surface 76 seats against the valve seat 66. When the valve member 72 is closed, the flow of pneumatic pressure between the inlet 50 and the outlet 52 is interrupted.

As best shown in FIG. 4, if any excessive pressure remains or is fed back from the outlet 52, the piston 98 will continue to be pushed back farther against the biasing force exerted by the piston biasing member 122 such that the bleed vent 118 through the piston 98 is exposed allowing the additional pressure to vent out through the adjustment bonnet 20. This state will continue until the downstream pressure drops or fluctuates. This state can be held indefinitely if the pneumatically actuated device is not using the regulated pressure and does not leak thereby creating pressure equilibrium. On the other hand, this state may be only instantaneous if the active device downstream is operating and using the regulated pressure as supplied by the present invention.

As the supplied regulated pressure is used and the pneumatic pressure acting on the responsive surface of the piston 98 drops below a predetermined value, the piston biasing member 122 will again automatically move the piston 98 and thus move the valve member 58 to its open position (FIG. 2) reestablishing the fluid communication between the inlet and outlet.

In this manner, it should be appreciated by those having ordinary skill in the art that the present invention provides distinct advantages over the prior art. More specifically, the present invention is embodied in a regulator housing 12 having a greatly reduced width as compared to regulators known in the related art, while maintaining a pressure responsive surface 106 on the piston 98 with great enough overall surface area to provide an accurate and highly responsive pressure regulator 10. This structure facilitates a regulator 10 having a much smaller physical size than has been previously attainable in the conventional art. Moreover, by providing a pressure regulator 10 of much smaller size, the present invention can be installed on, or in close proximity to, any device to be regulated such that the flow paths therebetween are shortened and the number of related hardware components are reduced. This simplifies the design of the pneumatically actuated system, which leads to reduced costs, increased efficiency and convenience.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A pneumatic pressure regulator assembly comprising:
a regulator housing having an inlet adapted for fluid communication with a supply of pneumatic pressure at a first elevated pressure, at least one outlet adapted to provide pneumatic pressure to at least one downstream pneumatically actuated device at a second, lower regulated pressure;
a regulator valve assembly having a valve member movably supported within said regulator housing between an open position and a closed position; and
a piston assembly movably supported in said regulator housing and acting to bias said valve member to its open position when the downstream pressure flowing through said outlet is below a predetermined value, said piston assembly including a pressure responsive surface defining a geometric shape having a major axis and a minor axis wherein the major axis is greater than the minor axis, said piston assembly being responsive to pneumatic pressure flowing between said inlet and said outlet to reduce the biasing force acting on said valve member such that said valve member moves to its closed position when the downstream pressure flowing through said outlet exceeds a predetermined value.

2. A pneumatic pressure regulating assembly as set forth in claim 1 wherein said piston assembly includes a piston defining a geometric shape having a major axis and a minor axis wherein the major axis is greater than the minor axis.

3. A pneumatic pressure regulating assembly as set forth in claim 2 further including a piston bore defined within said regulator housing, said piston movably supported within said piston bore, said piston bore defining a geometric shape that is complimentary to said piston and having a major axis and a minor axis wherein the major axis is greater than the minor axis.

4. A pneumatic pressure regulating assembly as set forth in claim 3 wherein said piston and said piston bore define an oval shape.

5. A pneumatic pressure regulating assembly as set forth in claim 1 wherein said regulator valve assembly includes a valve member having a valve element and a valve stem, and said valve element having a valve sealing surface said valve stem having a distal end opposite said valve element.

6. A pneumatic pressure regulating assembly as set forth in claim 5 wherein said regulator housing includes a valve retainer having a valve seat, a head portion and a body portion extending therebetween, said body portion defining a valve stem passage and including a plurality of flow passages spaced radially relative to one another about said body portion, said plurality of flow passages providing fluid communication between said outlet and said valve stem passage.

7. A pneumatic pressure regulating assembly as set forth in claim 6 wherein said valve member is operatively supported relative to said valve retainer such that said valve member is in its open position when said valve sealing surface of valve element is spaced from said valve seat thereby allowing fluid communication between said inlet and said outlet, said valve member adapted for sealing engagement with said valve seat when said valve element is in its closed position thereby interrupting fluid communication between said inlet and said outlet when the downstream pressure exceeds a predetermined value.

8. A pneumatic pressure regulating assembly as set forth in claim 7 wherein said valve stem is received by said valve stem passage, said valve stem passage of said valve retainer has an inner diameter greater than the outer diameter of said valve stem such that valve stem passage is adapted to allow pneumatic pressure to pass through said valve stem passage around said valve stem.

9. A pneumatic pressure regulating assembly as set forth in claim 6 wherein said head portion of said valve retainer includes an opening extending therethrough, said valve stem extends through said opening such that said distal end of said valve stem is in operative contact with said piston assembly, said distal end of said valve stem acting to translate the biasing force from said piston assembly to move said valve element to its open position such that said valve sealing surface of said valve element is spaced from said valve seat.

10. A pneumatic pressure regulating assembly as set forth in claim 9 wherein said piston assembly has a piston including a receptacle that is adapted to receive said distal end of said valve stem.

11. A pneumatic pressure regulating assembly as set forth in claim 10 wherein said piston includes a bleed vent extending therethrough, said bleed vent adapted to be closed by said distal end of said valve stem when said valve member is in the open position, said bleed vent adapted to be open when said valve member is moved to its closed position.

12. A pneumatic pressure regulating assembly as set forth in claim 5 wherein said valve member is an aluminum poppet valve, said valve sealing surface of said valve element being over-molded with a resilient material at the point where said valve member engages said valve seat.

13. A pneumatic pressure regulating assembly as set forth in claim 12 wherein said resilient material is made from at least one of a group comprising fluorocarbon rubber or highly saturated nitrile compounds.

14. A pneumatic pressure regulating assembly as set forth in claim 5 wherein said regulator valve assembly further includes a valve biasing assembly having a cup-shaped retainer in operative contact with said valve element and a valve biasing member disposed between said regulator housing and said cup-shaped retainer, said biasing member adapted to bias said valve member to its closed position by exerting a biasing force between said regulator housing and said cup-shaped retainer.

15. A pneumatic pressure regulating assembly as set forth in claim 14 wherein said valve biasing member includes at least one coiled spring.

16. A pneumatic pressure regulating assembly as set forth in claim 2 further including a regulator adjustment assembly, said regulator adjustment assembly including a piston biasing member that exerts a biasing force on said piston to bias said valve member to its open position.

17. A pneumatic pressure regulating assembly as set forth in claim 16 wherein said regulator adjustment assembly includes an adjustment member, said piston biasing member disposed between said adjustment member and said piston such that the biasing force exerted by said piston biasing member may be selectively adjusted by moving the said adjustment member toward or away from said piston to effect an adjustment of the biasing force corresponding to a pre-determined pressure value.

18. A pneumatic pressure regulating assembly as set forth in claim 17 wherein said piston biasing member includes at least one coiled spring disposed between said adjustment member and said piston.

19. A pneumatic pressure regulating assembly as set forth in claim 17 wherein said piston biasing member includes a plurality of coiled springs supported in concentric and coaxial relationship with respect to one another between said adjustment member and said piston.

20. A pneumatic pressure regulating assembly as set forth in claim 16 wherein regulator adjustment assembly includes a threaded adjustment stem and an adjustment nut threadably supported upon said adjustment stem for movement toward or away from the piston, said piston biasing member disposed between said piston and said nut.

21. A pneumatic pressure regulating assembly as set forth in claim 20 wherein regulator adjustment assembly includes adjustment knob operatively connected to said adjustment stem such that rotation of the adjustment knob rotates the threaded adjustment stem causing movement of the adjusting knob toward or away from the piston.

* * * * *